United States Patent [19]

Ream

[11] Patent Number: 4,504,956
[45] Date of Patent: Mar. 12, 1985

[54] LASER RESONATOR CAVITY

[75] Inventor: Stanley L. Ream, Columbus, Ohio

[73] Assignee: Laser Manufacturing Technologies, Inc., Columbus, Ohio

[21] Appl. No.: 427,974

[22] Filed: Sep. 29, 1982

[51] Int. Cl.$^3$ ............................................... H01S 3/08
[52] U.S. Cl. .................................... 378/107; 378/108; 378/103; 378/99
[58] Field of Search .................... 378/6, 20, 29, 33, 99, 378/103, 107, 108

[56] References Cited

U.S. PATENT DOCUMENTS

| 3,603,688 | 9/1971 | Smith-Vaniz | 378/107 |
| 4,144,505 | 3/1979 | Angelbeck et al. | 378/107 |
| 4,146,329 | 3/1979 | King et al. | 378/107 |

*Primary Examiner*—William L. Sikes
*Assistant Examiner*—Léon Scott, Jr.
*Attorney, Agent, or Firm*—George Wolken, Jr.

[57] ABSTRACT

Stability of the optical path in a laser resonator cavity is achieved by means of two reflective surfaces mounted orthogonally with respect to each other, serving as the reflector at one end of the resonator cavity. Return and feedback mirrors are rigidly mounted at the opposite end of the aforementioned resonator cavity. Changes in relative orientation not self-compensated by the use of orthogonally-mounted mirrors are corrected by means of a real-time servomechanism. A typical servomechanism comprises an auxiliary laser mounted rigidly to one end of the laser resonator cavity reflecting a collimated light beam from a reflector mounted rigidly to the opposite end of the resonator cavity. The reflected spot is detected by a detector, sensitive to positional changes in the reflected light, rigidly mounted with respect to the auxiliary laser. The positional changes of this reflected spot are used to drive a linear translator to correct the relative orientation in real-time.

6 Claims, 2 Drawing Figures

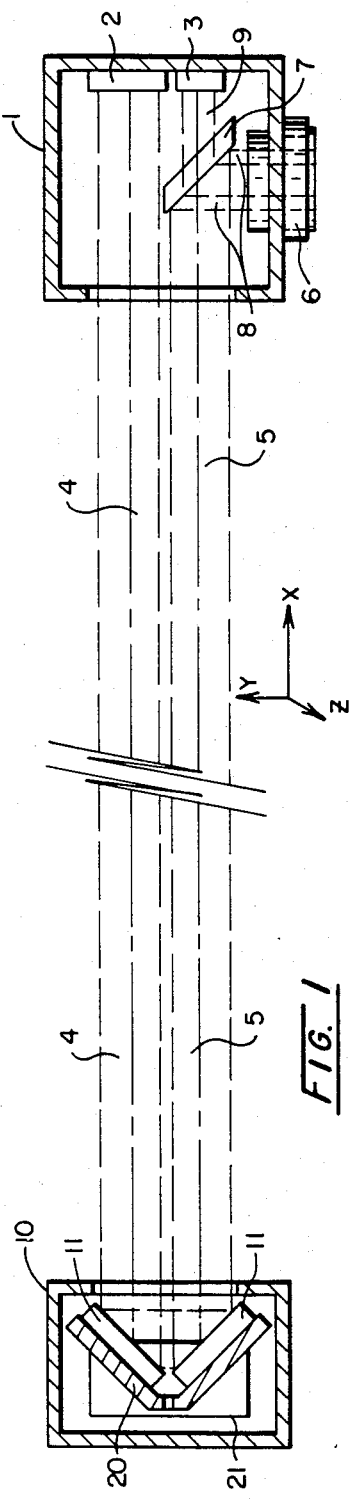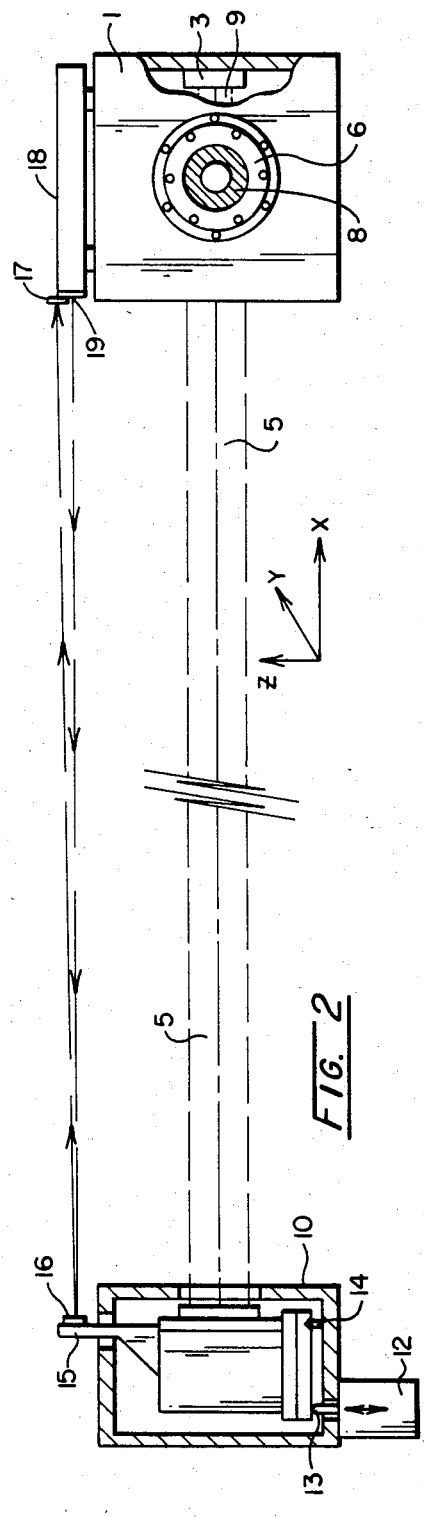

LASER RESONATOR CAVITY

BACKGROUND

The central part of any laser device is the cavity wherein external energy is converted into coherent, monochromatic "laser" light. In this central cavity, optical resonances occur which determine, in large part, the efficiency of operation and quality of the light obtained from any laser. For example, in the industrially-important $CO_2$ laser, an electrical discharge is often created in flowing gases. The excited gas thus created gives up its energy in the form of light in the laser resonator cavity. The design of this cavity has a significant impact on the structure of the resulting laser beam in terms of power distribution, mode structure, stability, etc. All these attributes are loosely referred to as "beam quality". For many industrial applications, high stability is needed in laser output. That is, the beam quality must be high and must remain so for long periods of time. Changing beam quality leads to changing focal characteristics of the beam and other problems. Hence, the amount of laser energy delivered to the work piece will vary and a predictable, reliable energy source has not been achieved.

For laser oscillation to occur, both ends of the laser resonator cavity must be partially or totally reflective at the wavelength of operation. The reflection characteristics of the ends of the laser resonator cavity must be critically designed, carefully engineered and skillfully constructed to be very stable. The relative alignment of reflecting devices at opposite ends of the laser resonator cavity must be precisely fixed and remain precisely fixed for as long as the laser is to be used. Should any misalignment of the cavity mirrors occur, from differential thermal expansion, mechanical vibration, etc. serious degradation can be expected in the performance of the laser.

One method of obtaining higher laser output power is to use a longer resonator cavity. Use of a longer cavity places a higher volume of excited lasing medium between the resonator mirrors, giving a longer path through which gain occurs. This leads to higher laser powers. However, longer resonator cavities cause the laser mirrors to be farther apart, making it more difficult to achieve and maintain precise mirror alignment.

Existing lasers have used a variety of methods to maintain mirror stability while increasing the output laser power. Large granite slabs have been used by Photon Sources, Inc. in their Turbolase T3000 laser and Alpha-Lase 250; various metal rods have been constructed to self-compensate for thermal changes, for example by Avco, Inc. in their Series 200 and HPL lasers, by Spectra Physics, Inc. in Models 971, 973, 975; and other mechanical stabilization means have been employed for example in the Series 9000 $CO_2$ Laser manufactured by Control Laser, Inc. Obviously, such methods become more cumbersome and more expensive as longer resonator cavities are constructed and the spacing between the mirrors increases. As users demand higher laser powers, excellent beam quality and long term operating stability, the need to maintain precise mirror alignment will become crucial.

SUMMARY

The present invention is addressed to a laser resonator cavity designed to reduce sensitivity to certain kinds of misalignment and to correct via feedback for those misalignments which still adversely affect beam quality. The present invention utilizes two surfaces reflective of laser radiation mounted at right angles to each other. The resulting structure is sometimes known as a "roof reflector". It has the desirable characteristic of returning any light beam incident upon it (within wide tolerances) in a direction antiparallel to the direction from which the beam impinged; provided the incident beam strikes the reflecting portions of the roof reflector from a direction perpendicular to the roof axis (e.g. the axis defined by the line of intersection of the two reflecting surfaces). Moderate rotations about the central, gain axis of the cavity (hereinafter called the X axis), or about a roof axis (defined here as the Z axis) do not affect the perpendicularity of the roof axis with respect to the cavity gain axis. Therefore, moderate misalignments of the relative orientation of cavity mirrors which can be decomposed into X or Z axis rotations, will not degrade laser performance. The laser beam propogating along the gain axis will be reflected on its return pass precisely parallel to its incident path, regardless of moderate distortions in relative mirror alignment of the types mentioned.

Distortions in relative mirror alignment equivalent to a rotation about the Y axis (perpendicular to both X and Z as defined above) will change the desired antiparallel reflecting nature of the roof reflector and degrade laser performance. This is corrected via a feedback mechanism comprising, in the preferred embodiment, a small highly collimated laser rigidly mounted on one end of the laser cavity, attached to the same structure as the mirrors. While it will probably be advantageous to mount the small alignment laser rigidly to the end of the laser cavity containing the return and feedback mirrors (opposite the roof reflector), this is not crucial. The reflecting structure opposite the alignment laser will have a reflecting device rigidly mounted thereon in the preferred embodiment, returning the light from the alignment laser to a region in the vicinity of the alignment laser itself. The reflected spot of light from the alignment laser will be detected by some means, typically an array of optical fibers connected to photodetectors. By connecting many fibers to each photodetector in the proper fashion, the electronic signal from the photodetectors can be made to change only when the motion of the alignment laser reflected spot moves in a way to indicate degradation of cavity performance. That is, proper connection of the optical fibers to photodetectors will detect only deleterious motions of the cavity mirrors. The resulting electrical signal can be used, in the preferred embodiment, to drive a linear drive motor, correcting the relative orientation of the cavity mirrors.

Several sets of roof reflectors can be mounted in a single laser cavity, each corrected by a separate feedback mechanism as described above. Use of several stages would lead to multiple passes through the laser cavity and higher output powers.

BRIEF DESCRIPTION OF THE DRAWING

FIG. 1 is a representation of the laser resonator cavity in top view.

FIG. 2 is a representation of the laser resonator cavity in side view.

DETAILED DESCRIPTION

In the description to follow, we shall describe the operation of the present invention as utilized in a two-pass laser cavity. This will sufficiently describe all important details of the present invention. However, the basic concept consists of the use of the right-angled roof reflector to achieve increased stability and a feedback mechanism to correct for the remaining instabilities. This mechanism can be employed several times within the same laser cavity, achieving multiple-pass laser operation and more gain. Since all the essential features of the present invention are clearly described in a two-pass cavity, and multi-pass devices are self-evident extensions of the two-pass system, we will confine our attention to a two-pass laser cavity as represented schematically in FIGS. 1 and 2.

The basic structure of a laser resonator cavity consists of two opposing regions (1) and (10) separated by a region containing active lasing medium (4), (5) together with suitable containment and excitation means to retain and excite gaseous or liquid lasing media. For the typical case of an electric discharge pumped $CO_2$ laser, the gain region (4) and (5) would contain the excited operating gases.

The operation of this device can best be understood by considering a light beam in gain region (4) traveling in the positive X direction and following the path of this hypothetical light beam around the laser cavity. This hypothetical light beam travels towards the right (positive X) in gain region (4), becoming amplified as it proceeds. The light beam strikes return mirror (2) and begins to traverse gain region (4) once again, traveling in the negative X direction, towards the left. Typically, return mirror (2) will be made of copper and diamond-machined for precise tolerances. If necessary for high-power operation, mirror (2) will be cooled by flowing gas or liquid.

This hypothetical light beam traverses region (4) from mirror (2) to the reflector structure in region (10), becoming further amplified as it proceeds through region (4). Upon entering region (10), the light beam impinges upon mirror (11) mounted rigidly on mirror-holder (20), and rigidly attached to a mirror assembly mount (21). Typically, mirrors (11) will be diamond-machined from copper, and cooled by flowing liquid or gas for high-power operation. Mirrors (11) are mounted rigidly on (20) such that mirrors (11) form a 90° angle. Such a structure is known in the art as a "roof reflector". A roof reflector has the desirable property that any light beam incident from a direction perpendicular to the roof axis (i.e. the line of intersection of the planes formed by mirrors (11)) will be reflected in a direction precisely antiparallel to the incident beam. Hence, the hypothetical light beam incident from the right in region (4) will strike mirrors (11) and re-emerge in region (5), traveling toward the right (positive X) in a direction precisely antiparallel to its path through region (4).

Upon completing its traverse of region (5), gaining in intensity, the light beam re-enters region (1). The light impinges upon a mirror (7) which is typically a diamond-machined annular-shaped copper mirror, known as a "scraper". That portion of the light beam intersected by the reflecting annulus (7) will be reflected through a transparent window (6) as an annular shaped output laser beam (8). The remaining portion of the light beam impinging on scraper (7) from gain region (5) will pass through the hole in the annular mirror, (7), to strike the feedback mirror (3). Upon reflection from mirror (3), the light retraces its path through the hole in scraper mirror (7), is amplified in gain region (5), reflected into gain region (4) by mirrors (11), is amplified in gain region (4), and is reflected once again from mirror (2). The light beam will now retrace its path through regions (4) and (5). Once again a portion of the amplified beam will be harvested by scraper mirror (7) to form the laser output.

Although we described the process in stepwise fashion, following the path of a hypothetical light beam throughout the system, in reality the process is continuously occurring. Unless interrupted by a mechanical or electrical means (typically by pulsing the electrical source of input power, or use of a mechanical shutter or chopper) the output will be continuous laser power.

For proper operation of a laser cavity resonator, the reflecting surfaces (2), (3) and (11) must be precisely aligned to insure that minimal light is lost from the gain regions. More importantly, this alignment must be maintained when the entire laser resonator is subjected to the thermal and mechanical stresses of extended operation, often in a factory environment. The present approach offers several advantages in achieving and maintaining stability. Since the feedback mirror (3) and the return mirror (2) are in close physical proximity, there will be minimal difficulty in maintaining the relative alignment of (2) with respect to (3). Typically, mirrors (2) and (3) would be rigidly mounted to the same structure. Thermal and mechanical perturbations will then affect (2) and (3) virtually identically, eliminating changes in relative orientation.

A much more difficult problem, and a major advantage of the present approach, is to achieve and maintain the orientation of mirror (11) with respect to mirrors (2) and (3). Since mirrors (11) are expected to be rigidly mounted to a rigid support (20) encased rigidly in mount assembly (21), and be in close physical proximity, thermal and mechanical perturbations should have negligible effect on the relative orientations of the separate mirrors comprising reflector (11) with respect to each other. A significant advantage of the present approach is to achieve and maintain stable relative orientation of mirrors (2) and (3) with respect to (11).

A key property of a roof reflector is that it returns any light beam incident upon it (within wide tolerances) in an antiparallel direction, provided that the incident light beam is incident from a direction perpendicular to the roof axis. Referring to FIG. 1, the roof axis lies along the Z axis as defined in the figure. The light beams of interest will impinge on the roof reflector from a direction parallel to the X axis. Therefore, moderate rotations of the roof reflector structure (11), (20) and (21) about the Z axis or about the X axis (both as defined in FIG. 1) will not destroy orthogonality of the laser beam with respect to the roof axis. Hence, moderate rotations of this sort will not destroy the desired parallel reflecting qualities of the roof reflector.

As noted above, we are concerned primarily with the relative orientations of mirror (2) and (3) with respect to (11). Hence, even though we will discuss changes in the orientation of the roof reflector structures (11), (20) and (21), we could just as well describe changes in the position of mirrors (2) and (3). The difference is merely semantic. The effect on laser operation would be the same in the both cases and the feedback mechanism necessary to correct for certain rotations would be the same in both cases.

Although rotations about the X or Z axis would not effect laser performance, rotation about the Y axis defined in FIG. 1 would. To compensate for any such changes in alignment, a real-time feedback mechanism has been invented to sense changes in relative orientation of (2) and (3) with respect to (11) and compensate for it. The preferred embodiment of such a feedback mechanism is described below.

A source of highly collimated light (18) in FIG. 2 is mounted rigidly on one end of the laser resonator cavity. Typically, this would be a laser light source, for example a He-Ne laser. While this is shown in FIG. 2 mounted rigidly to the feedback and return mirror assembly, (1) this is purely for purposes of illustration. The light source (18) could be mounted rigidly to the opposite assembly (10) without essential changes in the device.

The light (19) from source (18) strikes a reflector (16) rigidly mounted on the opposite end (21) of the laser resonator cavity by means of a rigid mount (15) attached to mirror assembly mount (21). Typically, (16) would be a precision mirror. Upon reflection from mirror (16), the light beam (19) returns to detector (17) for conversion into electrical signals. Typically, detector (17) will be constructed of light-transmitting optical fibers. Such fibers will be grouped together and connected to standard photodetectors. The grouping of optical fibers will be done by standard techniques such that motions of the light spot on detector (17) will cause changes in electrical signals from the photodetector only for those motions caused by deleterious changes in the relative orientations of (11) with respect to (2) and (3). That is, acceptable rotations about the X or Z axis in FIGS. 1 and 2 will not cause changes in electrical signals produced by light-detector (17) even though the position of the reflected light on detector (17) may change.

The electrical signals produced by detector (17) will be used to activate a linear drive motor (12) to adjust the optical mirror assembly mount (21) to compensate for any unwanted distortions. Typically, motor (12) will be a piezo-electric linear translator, adjusting the orientation of assembly (21) by inducing rotations about the Y axis. Such rotations will be caused by the linear drive axis (13) causing rotations about pivot (14). Such adjustments would occur in real-time, causing automatic correction in the optical alignment of the laser resonator cavity.

What is claimed is:

1. A laser resonator cavity comprising:
    (a) a resonant cavity containing an optically active medium capable of a population inversion;
    (b) a plurality of mirrors rigidly mounted with respect to each other at one end of said cavity;
    (c) a means for reflecting light beams incident upon said reflecting means in a direction antiparallel to said incident light beams, mounted at the opposite end of said cavity, positioned to reflect light beams toward said rigidly mounted mirrors;
    (d) a means for detecting deviations in the relative orientation of said reflecting means and said rigidly mounted mirrors;
    (e) a means for correcting the relative orientation of said reflecting means and said rigidly mounted mirrors.

2. A laser resonator cavity as in claim 1 wherein said reflecting means comprises at least one antiparallel reflector, wherein said reflector comprises two orthogonally mounted mirrors.

3. A laser resonator cavity as in claim 1 wherein said orientation detecting means comprises:
    (a) a source of coherent collimated light rigidly mounted to the first end of said cavity;
    (b) a means for reflecting said collimated light, rigidly mounted to the opposite, second, end of said cavity;
    (c) a means for detecting the position of the reflected coherent collimated light from said coherent light source, said coherent light source being rigidly attached to the first end of said cavity.

4. An orientation detecting means as in claim 3 wherein said collimated light source comprises a laser light source.

5. An orientation detecting means as in claim 3 wherein said light detecting means comprises an array of optical fibers connected to photodetectors.

6. A laser resonator cavity as in claim 1 wherein said orientation correcting means comprises a linear drive motor electrically driven by said orientation detecting means.

* * * * *